United States Patent
Gao et al.

(10) Patent No.: US 10,678,643 B1
(45) Date of Patent: *Jun. 9, 2020

(54) SPLITTING A GROUP OF PHYSICAL DATA STORAGE DRIVES INTO PARTNERSHIP GROUPS TO LIMIT THE RISK OF DATA LOSS DURING DRIVE REBUILDS IN A MAPPED RAID (REDUNDANT ARRAY OF INDEPENDENT DISKS) DATA STORAGE SYSTEM

(71) Applicant: EMC IP Holding Company LLC, Hopkinton, MA (US)

(72) Inventors: Jian Gao, Beijing (CN); Ilya Usvyatsky, Northborough, MA (US); Wayne Li, Beijing (CN); Geng Han, Beijing (CN); Hongpo Gao, Beijing (CN); Jibing Dong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 192 days.

This patent is subject to a terminal disclaimer.

(21) Appl. No.: 15/497,984

(22) Filed: Apr. 26, 2017

(51) Int. Cl.
*G06F 11/00* (2006.01)
*G06F 11/10* (2006.01)
*G06F 3/06* (2006.01)

(52) U.S. Cl.
CPC ........ *G06F 11/1092* (2013.01); *G06F 3/0619* (2013.01); *G06F 3/0665* (2013.01); *G06F 3/0689* (2013.01)

(58) Field of Classification Search
CPC .... G06F 3/0665; G06F 3/0644; G06F 3/0617; G06F 12/02; G06F 16/285; G06F 16/86; H04L 67/1097
See application file for complete search history.

(56) References Cited

U.S. PATENT DOCUMENTS

| 5,579,475 A | 11/1996 | Blaum et al. |
| 6,567,889 B1 | 5/2003 | DeKoning et al. |

(Continued)

OTHER PUBLICATIONS

Blaum, et al., "EVENODD: An Optical Scheme for Tolerating Double Disk Failures in RAID Architectures", RAID Architectures: IBM Research Report, RJ 9506, Sep. 1993, pp. 245-254.

(Continued)

*Primary Examiner* — Loan L. T. Truong
(74) *Attorney, Agent, or Firm* — BainwoodHuang

(57) ABSTRACT

In response to detecting that a total number of physical data storage drives in a group of physical data storage drives exceeds a maximum drive group size, the group of physical data storage drives is divided into a multiple partnership groups, and RAID extents in a RAID mapping table are divided into multiple RAID extent groups. Each one of the RAID extent groups contains multiple RAID extents and corresponds to one of the partnership groups of physical data storage drives. The RAID extents in each RAID extent group only indicate physical data storage drives contained in the corresponding partnership group of physical data storage drives, in order to ensure that data recovery and RAID extent rebuilding after a drive failure involve only the physical data storage drives within the same partnership group as the failed physical data storage drive.

21 Claims, 6 Drawing Sheets

(56) References Cited

U.S. PATENT DOCUMENTS

| | | | |
|---|---|---|---|
| 6,834,326 B1* | 12/2004 | Wang | G06F 11/1076 370/355 |
| 6,857,059 B2 | 2/2005 | Karpoff et al. | |
| 7,111,147 B1* | 9/2006 | Strange | G06F 3/0607 711/114 |
| 7,124,247 B2* | 10/2006 | Korgaonkar | G06F 3/0601 711/114 |
| 7,398,418 B2* | 7/2008 | Soran | G06F 3/0608 714/6.22 |
| 7,409,625 B2 | 8/2008 | Corbett et al. | |
| 7,424,637 B1* | 9/2008 | Schoenthal | G06F 3/0607 711/161 |
| 8,880,788 B1* | 11/2014 | Sundaram | G06F 3/0688 711/103 |
| 9,417,822 B1* | 8/2016 | Ballance | G06F 3/0689 |
| 9,519,556 B2* | 12/2016 | Joshi | G06F 11/2094 |
| 9,880,788 B2* | 1/2018 | Sabloniere | G06F 3/061 |
| 10,126,988 B1* | 11/2018 | Han | G06F 3/0604 |
| 10,140,041 B1* | 11/2018 | Dong | G06F 3/0619 |
| 10,146,447 B1* | 12/2018 | Dong | G06F 3/0613 |
| 10,162,548 B2* | 12/2018 | Robins | G06F 3/0631 |
| 10,296,252 B1* | 5/2019 | Han | G06F 11/1076 |
| 10,318,169 B2* | 6/2019 | Dalmatov | G06F 3/061 |
| 10,467,115 B1* | 11/2019 | Olderdissen | G06F 16/2365 |
| 2004/0260967 A1 | 12/2004 | Guha et al. | |
| 2005/0015653 A1* | 1/2005 | Hajji | G06F 11/1092 714/6.2 |
| 2005/0125610 A1* | 6/2005 | Korgaonkar | G06F 3/0601 711/114 |
| 2006/0075283 A1 | 4/2006 | Hartung et al. | |
| 2007/0118689 A1* | 5/2007 | Hyde, II | G06F 3/0607 711/114 |
| 2007/0143541 A1* | 6/2007 | Nichols | G06F 11/1084 711/114 |
| 2008/0010505 A1* | 1/2008 | Daikokuya | G06F 11/1092 714/6.2 |
| 2008/0168209 A1* | 7/2008 | Davison | G06F 3/0605 711/6 |
| 2009/0210619 A1* | 8/2009 | Mukker | G06F 3/0607 711/114 |
| 2010/0122115 A1* | 5/2010 | Olster | G06F 11/004 714/6.32 |
| 2010/0153640 A1* | 6/2010 | Jagadish | G06F 11/1096 711/114 |
| 2010/0174865 A1* | 7/2010 | Koester | G06F 21/80 711/114 |
| 2011/0208910 A1* | 8/2011 | Takada | G06F 3/0617 711/114 |
| 2012/0137065 A1 | 5/2012 | Odenwald et al. | |
| 2012/0173812 A1* | 7/2012 | Kidney | G06F 11/1076 711/114 |
| 2013/0205166 A1* | 8/2013 | Nair | G06F 3/0611 714/6.23 |
| 2013/0346794 A1* | 12/2013 | Bartlett | G06F 11/2094 714/6.21 |
| 2014/0089581 A1* | 3/2014 | DeNeui | G06F 3/0607 711/114 |
| 2014/0164849 A1* | 6/2014 | Floeder | G06F 11/004 714/47.2 |
| 2014/0365819 A1* | 12/2014 | Cooper | G06F 11/1092 714/6.22 |
| 2015/0012775 A1* | 1/2015 | Cudak | G06F 3/0619 714/6.22 |
| 2015/0081969 A1* | 3/2015 | Tanaka | G06F 3/0644 711/114 |
| 2015/0095573 A1* | 4/2015 | Kong | G06F 11/1076 711/114 |
| 2015/0154075 A1* | 6/2015 | Sugimoto | G06F 11/1096 714/6.24 |
| 2015/0193170 A1* | 7/2015 | Sundaram | G06F 3/0641 711/103 |
| 2015/0205668 A1* | 7/2015 | Sundaram | G06F 3/0689 714/6.24 |
| 2015/0286531 A1* | 10/2015 | Bondurant | G11B 5/012 714/6.23 |
| 2015/0324145 A1* | 11/2015 | Akutsu | G06F 3/0617 711/114 |
| 2015/0331716 A1* | 11/2015 | Brown | G06F 9/48 718/103 |
| 2015/0378613 A1* | 12/2015 | Koseki | G06F 3/0608 711/103 |
| 2016/0239397 A1* | 8/2016 | Thomas | G06F 11/2094 |
| 2016/0292025 A1* | 10/2016 | Gupta | G06F 11/076 |
| 2018/0088857 A1* | 3/2018 | Gao | G06F 3/0607 |
| 2018/0232164 A1* | 8/2018 | Jibbe | G06F 3/0619 |
| 2018/0232282 A1* | 8/2018 | Danilov | G06F 11/1435 |
| 2019/0121554 A1* | 4/2019 | Akutsu | G06F 3/0619 |

OTHER PUBLICATIONS

Miller, Scott A., "Comparing RAID 10 and Raid 01", SMB IT Journal; Jul. 30, 2014; <<http://www.smbitjournal.com/2014/07/comparing-raid-10-and-raid-01/>>article accessed Mar. 21, 2017, 6 pages.

Patterson, et al., "A Case for Redundant Arrays of Inexpensive Disks (RAID)", Proceedings of the 1988 ACM SIGMOD International Conference on Management of Data, ACM, 1988, pp. 109-116.

Perumal, et al., "A Tutorial on RAID Storage Systems", CS04-05-00. May 6, 2004. Data Network Architectures Group. Department of Computer Science. University of Capetown, 23 pages.

* cited by examiner

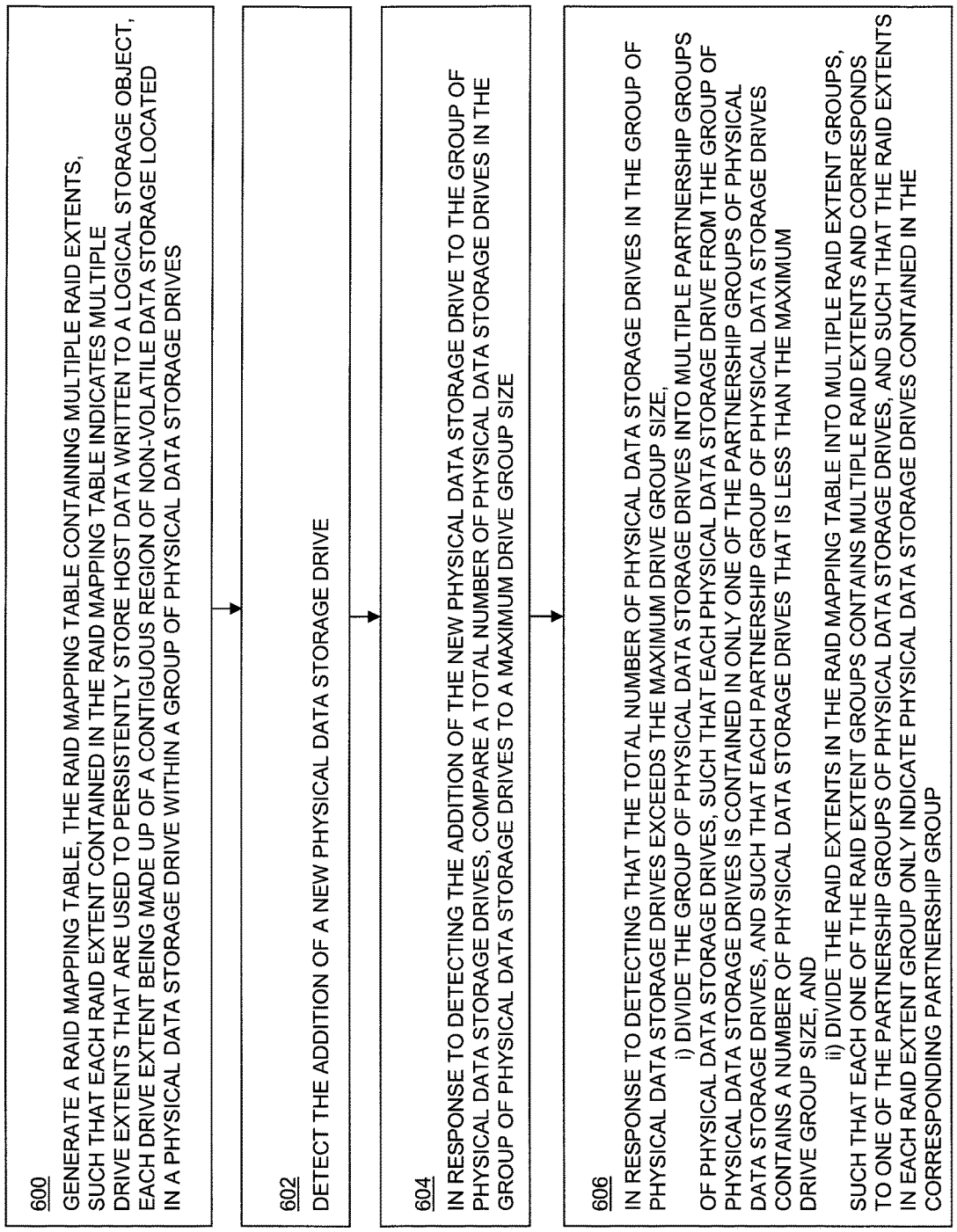

SPLITTING A GROUP OF PHYSICAL DATA STORAGE DRIVES INTO PARTNERSHIP GROUPS TO LIMIT THE RISK OF DATA LOSS DURING DRIVE REBUILDS IN A MAPPED RAID (REDUNDANT ARRAY OF INDEPENDENT DISKS) DATA STORAGE SYSTEM

TECHNICAL FIELD

The present disclosure relates generally to intelligent data storage systems, and more specifically to technology for splitting a group of physical data storage drives into partnership groups to limit the risk of data loss during drive rebuilds in a mapped RAID (Redundant Array of Independent Disks) data storage system.

BACKGROUND

Data storage systems are arrangements of hardware and software that typically include multiple storage processors coupled to arrays of non-volatile data storage devices, such as magnetic disk drives, electronic flash drives, and/or optical drives. The storage processors service host I/O operations received from host machines. The received I/O operations specify one or more storage objects (e.g. logical disks or "LUNs") that are to be written, read, created, or deleted. The storage processors run software that manages incoming I/O operations and that performs various data processing tasks to organize and secure the host data that is received from the host machines and stored on the non-volatile data storage devices.

Some existing data storage systems have supported RAID (Redundant Array of Independent Disks) technology. As it is generally known, RAID is a data storage virtualization/protection technology that combines multiple physical drives into a single logical unit to provide data redundancy and/or performance improvement. Data may be distributed across the drives in one of several ways, referred to as RAID levels, depending on the required levels of redundancy and performance. Some RAID levels employ data striping ("striping") to improve performance. In general, striping involves segmenting received host data into logically sequential blocks (e.g. sequential blocks of an address space of a logical storage object), and then storing consecutive blocks of the logical sequence of blocks onto different drives. A series of consecutive logically sequential data blocks that are stored across different drives is referred to as a RAID "stripe". By spreading data segments across multiple drives that can be accessed concurrently, total data throughput can be increased. Some RAID levels employ a "parity" error protection scheme to provide fault tolerance. When parity protection is used, one or more additional parity blocks are maintained in each stripe. For example, a parity block for a stripe may be maintained that is the result of performing a bitwise exclusive "OR" (XOR) operation across the data blocks of the stripe. When the storage for a data block in the stripe fails, e.g. due to a drive failure, the lost data block can be recovered by performing an XOR operation across the remaining data blocks and the parity block.

One typical RAID configuration that uses block level striping with distributed parity error protection is 4D+1P ("four data plus one parity") RAID-5. In 4D+1P RAID-5, each stripe consists of 4 data blocks and a block of parity information. In a traditional 4D+1P RAID-5 disk group, at least five storage disks are used to store the data and parity information, so that each one of the four data blocks and the parity information for each stripe can be stored on a different disk. A spare disk is also kept available to handle disk failures. In the event that one of the disks fails, the data stored on the failed disk can be rebuilt onto the spare disk by performing XOR operations on the remaining data blocks and the parity information on a per-stripe basis. 4D+1P RAID-5 is generally considered to be effective in preventing data loss in the case of single disk failures. However, data may be lost when two or more disks fail concurrently.

Other RAID configurations may provide data protection even in the event that multiple disks fail concurrently. For example, RAID-6 provides striping with double distributed parity information that is provided on a per-stripe basis. The double parity information maintained by RAID-6 enables data protection for up to a maximum of two concurrently failing drives.

SUMMARY

Traditional data storage systems providing RAID data protection have exhibited significant limitations with regard to the ability to add new disks, and with regard to the amount of time required to rebuild data onto a replacement disk in the event of a disk failure. With regard to adding new disks, traditional RAID systems do not support the addition of new disks on an individual disk basis, instead requiring that new storage capacity be added only in increments equal to the number of disks that is required to support the specific RAID configuration, i.e. equal to the width of the RAID stripe being used. Accordingly, for 4D+1P RAID-5 configurations, new disks can only be added in increments of five disks at a time. For RAID-6 configurations, new disks can only be added in increments of six disks. As the capacity of individual disks has increased over time with the introduction of new storage technologies, this inflexibility in terms of adding new capacity has become increasingly burdensome and impractical.

Also as individual disk capacity has increased, the time required to rebuild data from an entire failed disk onto a single spare disk has increased, and the write bandwidth of a single spare disk has become a significant performance bottleneck with regard to total rebuild time. Moreover, as data from a failed disk is being rebuilt onto a spare disk, concurrent failure of one or more additional disks during the rebuilding process may introduce the risk of data loss.

Mapped RAID allows for the addition of individual storage drives to a data storage system in order to increase storage capacity, and also addresses the problem of increased rebuild times caused by write bandwidth bottlenecks in dedicated spare disks. In mapped RAID technology, physical data storage drives are divided into drive extents that are allocated from a drive extent pool. A RAID mapping table organizes the allocated drive extents into RAID extents that indicate the allocated drive extents. Each RAID extent indicates a set of drive extents allocated from the drive extent pool, and each drive extent allocated to a given RAID extent may be located on a different physical drive. The drive extents indicated by a RAID extent are used to store the blocks of data and parity information for a stripe represented by the RAID extent. Accordingly, the number of drive extents indicated by each RAID extent may be the same as the number of disks used in traditional RAID to store data blocks and parity information for the same RAID level. For example, in a mapped RAID group supporting a 4D+1P RAID-5 configuration, each RAID extent indicates a total of five drive extents that are used to store the four blocks of data and the parity information block of the stripe represented by the RAID extent. In a RAID-6 configuration, two parity information blocks are used per-stripe to provide an increased level of fault tolerance.

In the event that a drive fails when using mapped RAID, spare drive extents can be allocated that are located on multiple physical drives contributing to the drive extent pool in order to replace the drive extents from the failed drive, thus spreading the rebuild read and write operations across multiple physical drives, and eliminating the write bandwidth bottleneck previously caused by traditional RAID's reliance on rebuilding to a single spare physical data storage drive. In this way, mapped RAID can generally reduce rebuild time in the face of a single drive failure. Moreover, as the number of physical data storage drives increases, the amount of concurrent processing that can be used during the rebuild process also increases, resulting in progressively improving rebuild performance for increasing numbers of physical data storage drives that are used to support a given RAID configuration.

However, while increasing the number of physical data storage drives that are used to support a mapped RAID configuration may, up to a point, increase rebuild performance due to the increased ability to spread the rebuild process across larger numbers of physical data storage drives, each physical data storage drive added to the group of physical data storage drives has its own independent probability of failure at any specific time. Accordingly, the probability of one or more additional drives failing at any point in time during the rebuild process also increases as more drives are added to the group. When the total number of physical data storage drives reaches a sufficiently large number, the level of concurrent processing available during the rebuild process is no longer limited by the number of physical drives, and instead becomes limited by the availability and/or performance of one or more resources in the data storage system other than the physical drives, e.g. the availability and/or performance of the storage system CPUs, the availability and/or performance of the storage system memory, etc. After the number of physical drives reaches such a maximum effective number, simply allowing more physical drives to be added still continues to increase the probability of one or more additional drives failing during the rebuild process, without providing further improvement in rebuild time performance. Previous systems that have simply allowed the indefinite addition of more and more individual physical data storage drives have therefore caused the risk of data loss to be continuously increased, without recognizing that rebuild time performance will eventually be limited predominantly by factors other than the number of physical data storage drives that can participate in the rebuilding process.

To address these and other shortcomings of previous systems, new technology is disclosed herein for providing mapped RAID data protection for a storage object in a data storage system, that splits a group of physical data storage drives into partnership groups to limit the risk of data loss occurring during drive rebuilds in the event of a drive failure. In the disclosed technology, a RAID mapping table is generated that contains multiple RAID extents. Each RAID extent in the RAID mapping table indicates multiple drive extents that are used to persistently store host data written to the storage object. Each drive extent is made up of a contiguous region of non-volatile data storage in one of the physical data storage drives.

When the data storage system detects that a new physical data storage drive has been added to the group of physical data storage drives, a total number of physical data storage drives in the group of physical data storage drives (including the newly added drive) is compared to a maximum drive group size. In response to detecting that the total number of physical data storage drives in the group of physical data storage drives exceeds the maximum drive group size, the disclosed technology divides the group of physical data storage drives into multiple partnership groups of physical data storage drives. Each physical data storage drive from the group of physical data storage drives is contained in only one of the partnership groups of physical data storage drives, and each partnership group of physical data storage drives contains a number of physical data storage drives that is less than the maximum drive group size. Further in response to detecting that the total number of physical data storage drives in the group of physical data storage drives exceeds the maximum drive group size, the RAID extents in the RAID mapping table are divided into multiple RAID extent groups. Each one of the RAID extent groups contains multiple RAID extents and corresponds to one of the partnership groups. The RAID extents in each RAID extent group only indicate physical data storage drives that are contained in the corresponding partnership group of physical data storage drives.

In another aspect of the disclosed technology, dividing the RAID extents in the RAID mapping table into the multiple RAID extent groups may include assigning each RAID extent in the RAID mapping table to a RAID extent group. At least one RAID extent is identified that indicates at least one drive extent that is located in a physical data storage drive that is contained in a partnership group other than the partnership group that corresponds to the RAID extent group to which that RAID extent is assigned. Each RAID extent that indicates at least one drive extent that is located in a physical data storage drive that is contained in a partnership group other than the partnership group that corresponds to the RAID extent group to which that RAID extent is assigned is modified to indicate only drive extents that are located in physical data storage drives that are contained in the partnership group that corresponds to the RAID extent group to which that RAID extent is assigned.

In another aspect of the disclosed technology, each RAID extent in the RAID mapping table may indicate the same number of drive extents, and a minimum number of physical data storage drives that is required to provide RAID data protection for the storage object in the data storage system may be greater than the number of drive extents indicated by each RAID extent in the RAID mapping table. The maximum drive group size may be at least twice as large as the minimum number of physical data storage drives required to provide RAID data protection for the storage object in a data storage system.

Dividing the group of physical data storage drives into the multiple partnership groups of physical data storage drives may include dividing the group of physical data storage drives into two partnership groups of physical data storage drives. A first partnership group of physical data storage drives may be made up of a first half of the physical storage drives in the group of physical data storage drives, and a second partnership group of physical data storage drives may be made up of a second half of the physical data storage drives in the group of physical data storage drives.

In another aspect of the disclosed technology, multiple unallocated drive extents located in physical data storage drives contained in the first partnership group may be spare drive extents that are available to be allocated, in response to detecting a failure of a physical data storage drive contained in the first partnership group, to one or more RAID extents in the RAID extent group corresponding to the first partnership group, to replace drive extents located in the failed physical data storage drive. Multiple unallocated drive extents located in physical data storage drives contained in the second partnership group may be spare drive extents that are available to be allocated, in response to detecting a failure of a physical data storage drive contained in the second partnership group, to one or more RAID extents in the RAID extent group corresponding to the second partnership group, to replace drive extents located in the failed physical data storage drive.

Embodiments of the disclosed technology may provide significant advantages over previous technical solutions. The disclosed technology advantageously operates to split a group of physical data storage drives into partnership groups in response to detecting that the total number of physical data storage drives in the group exceeds a maximum drive group size, in order to limit the risk of data loss occurring during the rebuild process following a drive failure. By dividing the RAID mapping table into RAID extent groups that each correspond to an individual partnership group, such that RAID extents assigned to a RAID extent group only indicate drive extents allocated from within physical data storage drives contained in the partnership group that corresponds to the RAID extent group, the disclosed technology ensures that the rebuilding process following a drive failure involves only the physical data storage drives contained within the same partnership group as the failed drive, thus limiting the cumulative risk that one or more additional physical data storage drives will fail during the rebuilding process. In this way the disclosed technology limits the risk of data loss resulting from simultaneous multi-drive failures, while continuing to allow individual physical data storage drives to be added to and used by the data storage system to store host data within the resulting partnership groups.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 6 is a flow chart showing an example of steps performed during operation of some embodiments of the disclosed technology.

DETAILED DESCRIPTION

Embodiments of the invention will now be described. It should be understood that the embodiments described below are provided only as examples, in order to illustrate various features and principles of the invention, and that the invention is broader than the specific embodiments described below.

Figure 1:
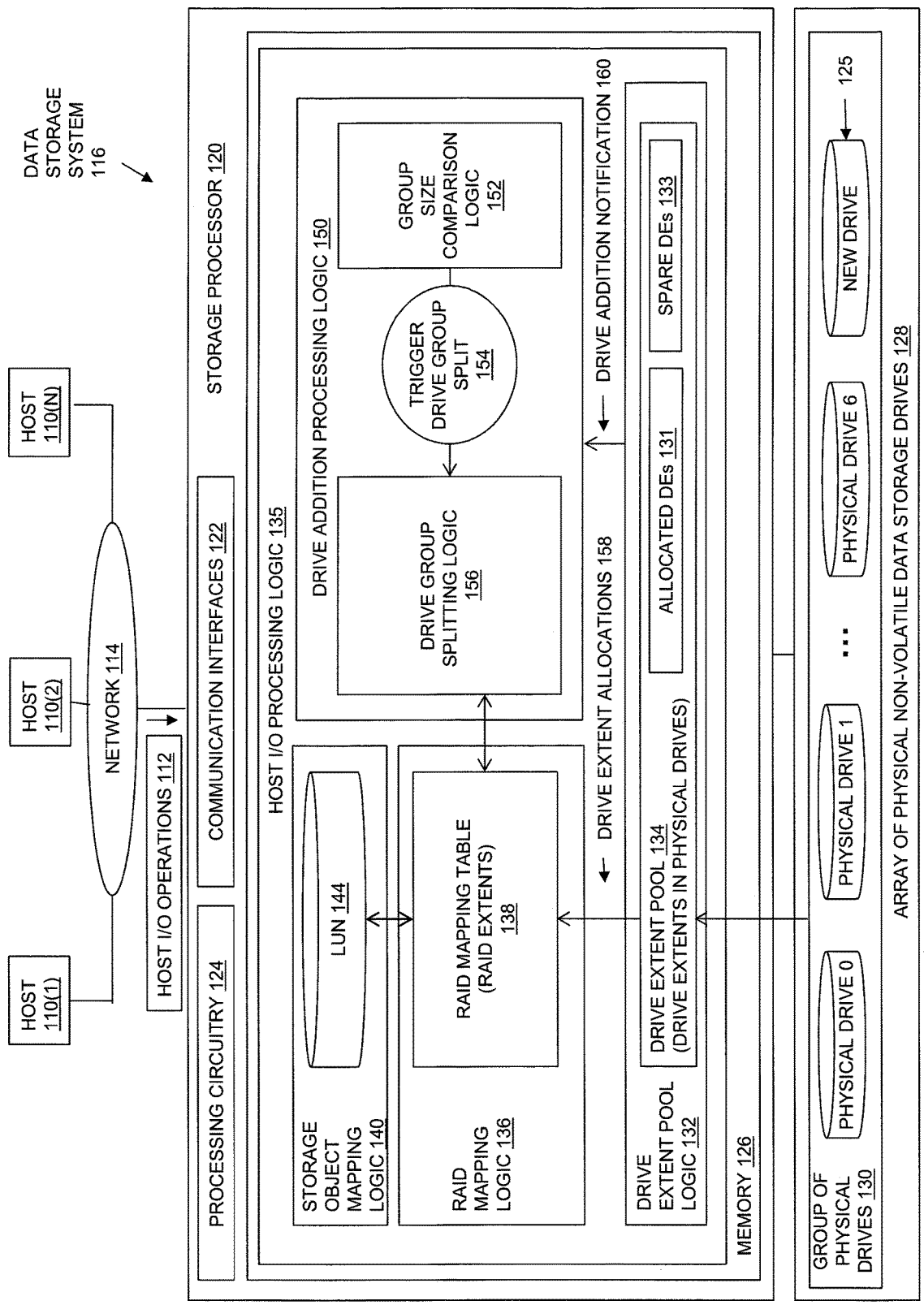
FIG. 1 is a block diagram showing an operational environment for the disclosed technology, including an example of a data storage system in which the disclosed technology may be embodied, with a group of physical data storage drives to which a new physical data storage drive has been added.

FIG. 1 is a block diagram showing an operational environment for the disclosed technology, including an example of a data storage system in which the disclosed technology may be embodied. The data storage environment of FIG. 1 includes some number of Host Computing Devices 110, referred to as "hosts" and shown for purposes of illustration by Hosts 110(1) through 110(N), that access data storage provided by Data Storage System 116, for example over one or more computer networks, such as a local area network (LAN), and/or a wide area network (WAN) such as the Internet, etc., shown in FIG. 1 by Network 114. Data Storage System 116 includes at least one Storage Processor 120 and an Array of Non-Volatile Data Storage Drives 128. Storage Processor 120 may, for example, be provided as a circuit board assembly, or "blade," which plugs into a chassis that encloses and cools multiple storage processors, and that has a backplane for interconnecting storage processors. However, no particular hardware configuration is required, and Storage Processor 120 may be embodied as any specific type of computing device capable of processing host input/output (I/O) operations received from Hosts 110 (e.g. I/O read and I/O write operations, create storage object operations, delete storage object operations, etc.).

The Array of Non-Volatile Data Storage Drives 128 may include physical data storage drives such as magnetic disk drives, solid state drives, hybrid drives, and/or optical drives. Array of Non-Volatile Data Storage Drives 128 may be directly physically connected to and/or contained within Storage Processor 120, and/or may be communicably connected to Storage Processor 120 by way of one or more computer networks, e.g. including or consisting of a Storage Area Network (SAN) or the like.

A Memory 126 in Storage Processor 120 stores program code that is executable on Processing Circuitry 124. Memory 126 may include volatile memory (e.g. RAM), and/or other types of memory. The Processing Circuitry 124 may, for example, include or consist of one or more microprocessors, e.g. central processing units (CPUs), multi-core processors, chips, and/or assemblies, and associated circuitry. Processing Circuitry 124 and Memory 126 together form control circuitry, which is configured and arranged to carry out various methods and functions as described herein. The Memory 126 stores a variety of software components that may be provided in the form of executable program code. For example, as shown in FIG. 1, Memory 126 may include software components such as Host I/O Processing Logic 135. When the program code is executed by Processing Circuitry 124, Processing Circuitry 124 is caused to carry out the operations of the software components. Although certain software components are shown and described for purposes of illustration and explanation, those skilled in the art will recognize that Memory 126 may include various other software components, such as an operating system, various applications, processes, etc.

During operation, Drive Extent Pool Logic 132 initially generates Drive Extent Pool 134 by first dividing each one of the physical data storage drives in the Group of Physical Drives 130 into multiple, equal size drive extents, each of which consists of physically contiguous non-volatile data storage located on a drive. For example, Drive Extent Pool Logic 132 may divide each one of the physical data storage drives in the Array of Physical Non-Volatile Data Storage Devices 128 into a fixed number of equal size drive extents of physically contiguous non-volatile storage, and add each one of the resulting drive extents to Drive Extent Pool 134. The drive extents in Drive Extent Pool 134 may each either be i) one of Allocated Drive Extents 131 that are allocated to a RAID extent in the RAID Mapping Table 138, or ii) one of Spare Drive Extents 133 that are unallocated "spare" drive extents available for future allocation to RAID extents in RAID Mapping Table 138 in response to a failure condition, e.g. to replace, within RAID extents in RAID Mapping Table 138, drive extents located in a failed drive in the Group of Physical Drives 130.

The Group of Physical Drives 130 from which Drive Extent Pool 134 is generated may consist of all the physical data storage drives in Array of Physical Non-Volatile Data Storage Drives 128, or only a subset of the physical data storage drives in Array of Physical Non-Volatile Data Storage Drives 128. Accordingly, the disclosed techniques may be embodied such that Array of Physical Non-Volatile Data Storage Drives 128 includes multiple separate groups of physical data storage drives, each one of which may be used to independently generate a separate pool of drive extents, and that may be split into partnership groups, as described herein.

The size of the drive extents into which the physical drives in the Group of Physical Drives 130 are divided is the same for every physical data storage drive in the Group of Physical Drives 130. Various specific sizes of drive extents may be used in different embodiments. For example, in some embodiments each drive extent may have a size of 10 gigabytes. Larger or smaller drive extent sizes may be used in the alternative. Any specific number of physical data storage drives may be contained in the Group of Physical Drives 130 and divided into equal size drive extents to generate Drive Extent Pool 134. The physical data storage drives in the Group of Physical Drives 130 may each have the same total capacity, and may accordingly each be divided into the same number of drive extents. Alternatively, the physical data storage drives in Group of Physical Drives 130 may have a variety of different capacities, resulting in different physical data storage drives being divided into different numbers of equal size drive extents.

After dividing each one of the physical data storage drives in the Group of Physical Drives 130 into multiple, equal size drive extents of physically contiguous non-volatile data storage, and adding the drive extents to Drive Extent Pool 134, drive extents may be allocated to specific RAID extents contained in RAID Mapping Table 138, to be used to store host data directed to the RAID extents to which they are allocated, as shown at reference number 158 of FIG. 1. For example, a drive extent may be allocated from Drive Extent Pool 134 to a specific RAID extent contained in RAID Mapping Table 138 in response to an allocation request from RAID Group Mapping Logic 136, and then used to store host data that is directed to LUN 144 and mapped to that specific RAID extent.

In some embodiments, drive extents are allocated to RAID extents in the RAID Mapping Table 138, before and after Group of Physical Drives 130 is divided into multiple partnership groups, such that no two drive extents indicated by any single RAID extent are located on the same physical storage drive.

A drive extent may be deallocated from a specific RAID extent back to Drive Extent Pool 134, and thereby made available for allocation to a different RAID extent, in response to a deallocation request from RAID Group Mapping Logic 136, e.g. when the drive extent is no longer needed.

When a drive extent is allocated to a RAID extent, an indication of the drive extent is stored in the RAID extent. For example, a drive extent allocated to a RAID extent may be indicated within that RAID extent using a pair of indexes "m|n", in which "m" indicates a drive index of the physical data storage drive on which the drive extent is located (e.g. a numeric drive number within Array of Physical Non-Volatile Storage Drives 128, a slot number within which the physical drive located, or a textual drive name, etc.), and "n" indicates an index of the drive extent within the physical data storage drive (e.g. a numeric drive extent number, a block offset, a sector number, etc.). For example, in embodiments in which physical data storage drives are indexed within Array of Physical Non-Volatile Data Storage Devices 128 starting with 0, and in which drive extents are indexed within the physical data storage drive that contains them starting with 0, a first drive extent of a first physical data storage drive within Array of Physical Non-Volatile Data Storage Drives 128 may be represented by "0|0", a second drive extent within the first physical data storage drive within Array of Physical Non-Volatile Data Storage Drives 128 may be represented by "0|1", and so on.

Host I/O Processing Logic 135 exposes one or more logical storage objects to Hosts 110 for reading and/or writing host data, so that Hosts 110 can issue Host I/O Operations 112 to specific storage objects, e.g. using names or other identifiers of the storage objects. The storage objects exposed to Host I/O Operations 112 may be written, read, created, and/or deleted by Hosts 110 through Host I/O Operations 112. The storage objects exposed to Hosts 110 may include or consist of logical disks sometimes referred to as "LUNs", such as LUN 144. The storage objects exposed to Hosts 110 may alternatively include or consist of a host file system, virtual volume, and/or some other type of storage object, which Host I/O Processing Logic 135 makes accessible to Hosts 110 for reading and/or writing host data.

Storage Object Mapping Logic 140 directs host data written to sets of consecutive blocks in a logical address space of LUN 144 to specific corresponding RAID extents in RAID Mapping Table 138, so that the host data written to a set of consecutive blocks in the logical address space can be persistently stored by drive extents indicated by the corresponding RAID extent, and so that parity information can be calculated and stored in at least one of the drive extents of the corresponding RAID extent to support data recovery. For example, an address space of LUN 144 may be made up of a set of sequential, equal size logical blocks of address space. Each host write I/O operation may indicate a specific block to be written within the address space of the LUN 144, e.g. using a logical block number or offset into LUN 144. In some embodiments, 4D+1P RAID-5 block level striping with distributed parity error protection may be used, with each RAID stripe consisting of four data blocks and a block of parity information, and each RAID stripe being represented by a single RAID extent and mapped to drive extents indicated by that RAID extent. In such embodiments, each RAID extent may indicate five drive extents. For each set of four consecutive blocks in the logical address space of LUN 144 that are mapped to a single RAID extent, host data is striped across the disk extents indicated by that RAID extent by storing host data written to consecutive ones of the four consecutive blocks of the logical address space into different ones of four of the drive extents indicated by that RAID extent. Parity information is calculated and stored in a fifth drive extent indicated by the RAID extent, e.g. as an XOR of the host data stored in the other four drive extents indicated by the RAID extent. In this way, host data stored in any one of the four drive extents indicated by the RAID extent that store host data can be recovered in the event of a failure of a physical data storage drive containing one of the four drive extents indicated by the RAID extent that store host data, for example by performing one or more XOR operations on the data stored in the three surviving drive extents indicated by the RAID extent that store host data, in combination with the parity information stored in the fifth drive extent indicated by the RAID extent.

Further during operation, Drive Extent Pool Logic 132 detects the addition of a new physical storage drive, i.e. New Drive 125, to the Group of Physical Drives 130. For example, Drive Extent Pool Logic 132 may receive an indication that New Drive 125 has been inserted into Array of Physical Non-Volatile Data Storage Drives 128. In response to detecting that New Drive 125 has been added to the Group of Physical Drives 130, Drive Extent Pool Logic 132 may pass an indication that New Drive 125 has been added to the Group of Physical Drives 130 to the Drive Addition Processing Logic 150, as shown by Drive Addition Notification 160. Drive Addition Notification 160 may include a total number of storage drives in the Group of Physical Drives 130, after the addition of New Drive 125 to the Group of Physical Drives 130. For example, if prior to the addition of New Drive 125 to the Group of Physical Drives 130, the Group of Physical Drives 130 had contained physical drives 0 through 6 for a previous total of 7 drives, then after the addition of New Drive 125 to Group of Physical Drives 130, the total number of storage drives in the Group of Physical Storage Drives 130 would be 8. Also note that in FIG. 2 New Drive 125 is labeled as physical drive 7 in Array of Physical Non-Volatile Data Storage Drives 128. Accordingly, the New Drive 125 shown in FIG. 1 is the same physical data storage drive as the physical drive 7 shown in FIG. 2.

In response to receiving the Drive Addition Notification 160 from Drive Extent Pool Logic 132, Drive Addition Processing Logic 150 causes Group Size Comparison Logic 152 to compare the total number of physical data storage drives in the Group of Physical Storage Drives 130, after the addition of New Drive 125, to a maximum drive group size. The maximum drive group size may, for example, be an integer configuration value that is set by a system administrator, or provided to Storage Processor 120 in some other way. The value of maximum drive group size may, for example, be the output of or reflect performance tests performed on Data Storage System 116 and/or similar devices, under actual or simulated drive failure conditions, with different numbers of physical data storage devices contained in Group of Physical Drives 130. For example, the value of the maximum drive group size may indicate a maximum number of physical data storage drives that may be contained in Group of Physical Drives 130 before the level of concurrent processing available during the rebuild process becomes limited by the availability and/or performance of one or more resources in the data storage system other than the physical drives, e.g. by the availability and/or performance of Processing Circuitry 124, and/or the availability and/or performance of Memory 126, etc., such that using numbers of storage drives in Group of Physical Drives 130 larger than the maximum drive group size fails to provide a significant improvement (i.e. significant or sufficient decrease) in the time required to perform a rebuild process following a failure of one of the physical data storage drives.

For purposes of explanation, the total number of storage drives in the Group of Physical Storage Drives 130, after the addition of New Drive 125, is 8, and the maximum drive group size is 7. Accordingly, Group Size Comparison Logic 152 detects that the total number of physical data storage drives in the Group of Physical Storage Drives 130 after the addition of New Drive 125 exceeds the maximum drive group size.

In response to Group Size Comparison Logic 152 detecting that the total number of physical data storage drives in Group of Physical Drives 130 exceeds the maximum drive group size, Group Size Comparison Logic 152 sends a trigger (e.g. Trigger Drive Group Split 154) to Drive Group Splitting Logic 156, such as a message or other indication, that causes Drive Group Splitting Logic 156 to divide the Group of Physical Drives 130 into multiple partnership groups, and to divide RAID Mapping Table 138 into multiple RAID extent groups that each correspond to a respective one of the partnership groups.

Figure 2:
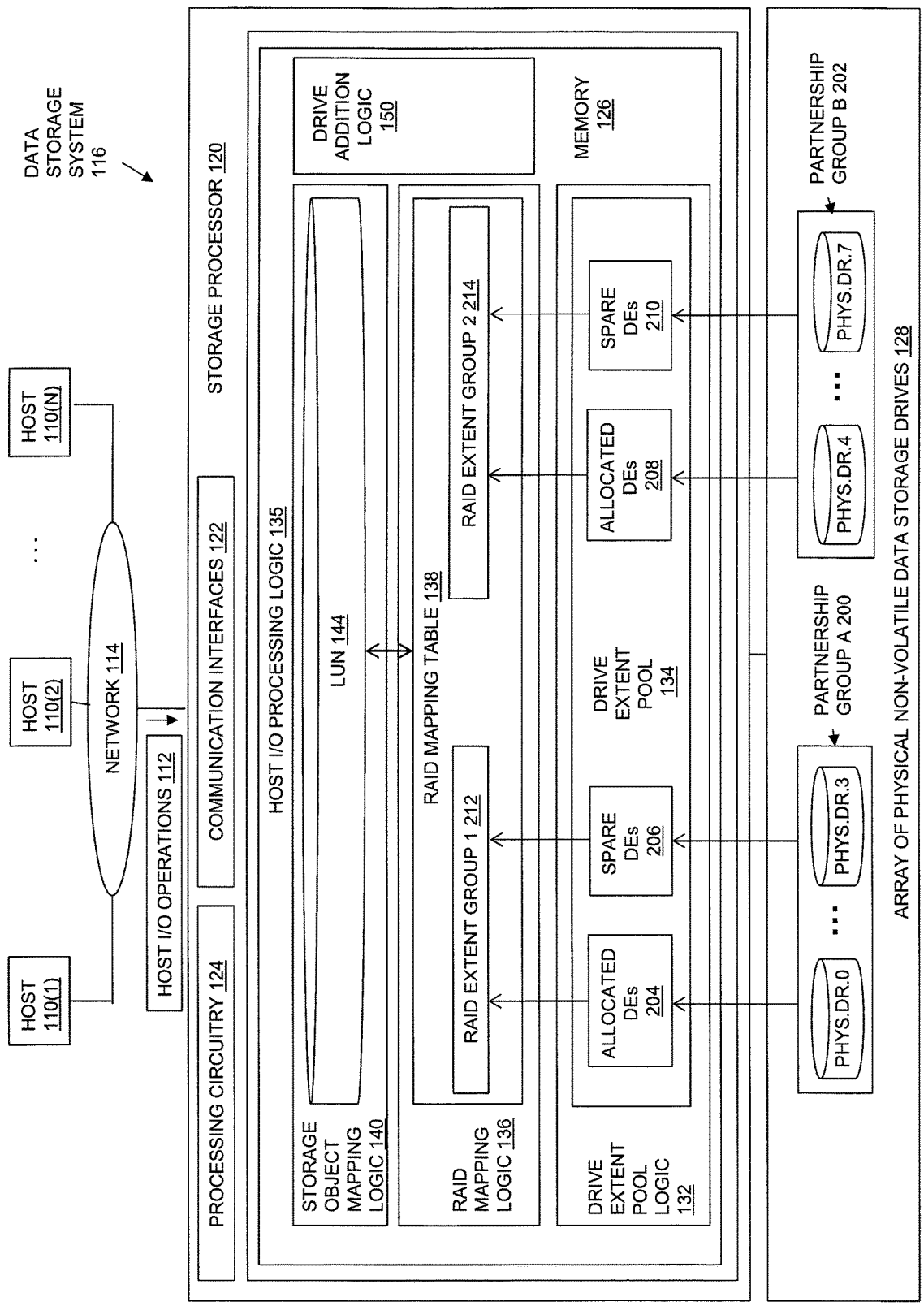
FIG. 2 is a block diagram showing the operational environment of FIG. 1, after the group of physical data storage drives shown in FIG. 1 has been divided into multiple partnership groups and the RAID mapping table has been divided into multiple RAID extent groups.

For example, as shown in FIG. 2, a trigger from Group Size Comparison Logic 152 that is issued to Drive Group Splitting Logic 156 in response to Group Size Comparison Logic 152 detecting that the total number of physical data storage drives in the Group of Physical Drives 130 exceeds the maximum drive group size causes Drive Group Splitting Logic 156 to divide the Group of Physical Drives 130 into a Partnership Group A 200 that is made up of physical data storage drives 0 through 3, and a Partnership Group B 202 that is made up of physical data storage drives 4 through 7, in which New Drive 125 from FIG. 1 is included in Partnership Group B 202 as physical data storage drive 7.

FIG. 2 shows an example of operation in which the Group of Physical Drives 130 of FIG. 1 is divided by Drive Group Splitting Logic 156 of FIG. 1 into two partnership groups (i.e. Partnership Group A 200 and Partnership Group B 202), such that each physical data storage drive from the Group of Physical Drives 130 is contained in only one of the partnership groups, e.g. each of the physical data storage drives 0 through 7 is contained in only one of either Partnership Group A 200 or Partnership B 202. As also shown in the example of FIG. 2, each one of the partnership groups that are created by Drive Group Splitting Logic 156 both i) contains half of the physical data storage drives from Group of Physical Drives 130, and ii) contains a total number of physical data storage drives that is less than the maximum drive group size. In the example of FIG. 2, each one of Partnership Group A 200 and Partnership Group B 202 contains 4 physical drives, which is less than the example maximum drive group size of 7.

Drive Group Splitting Logic 156 may select the specific physical drives to be contained in Partnership Group A 200 and Partnership Group B 202 using any specific selection technique. For example, half of the physical data storage drives in Group of Physical Drives 130 having the lowest drive indexes may be selected for Partnership Group A 200, while half of the physical data storage drives in Group of Physical Drives 130 having the highest drive indexes may be selected for Partnership Group B 202. In an alternative approach, physical data storage drives having odd drive indices may be selected for one partnership group, while physical data storage drives having even drive indices may be selected for another, different partnership group. Any other specific selection technique may be used for selecting the specific physical data storage drives that are contained in specific ones of the partnership groups.

The trigger message 154 from Group Size Comparison Logic 152 that is issued to Drive Group Splitting Logic 156 in response to Group Size Comparison Logic 152 detecting that the total number of physical data storage drives in the Group of Physical Drives 130 exceeds the maximum drive group size further causes Drive Group Splitting Logic 156 to divide the RAID extents in RAID Mapping Table 138 into multiple RAID extent groups, as for example shown in FIG. 2 by RAID Extent Group 1 212 and RAID Extent Group 2 214. Each one of RAID Extent Group 1 212 and RAID Extent Group 2 214 contains multiple RAID extents, and corresponds to one of the partnership groups of physical drives. For example, RAID Extent Group 1 212 corresponds to Partnership Group A 200, and RAID Extent Group 2 214 corresponds to Partnership Group B 202.

The RAID extents in each RAID extent group only indicate drive extents that are located in physical data storage drives that are contained in the corresponding one of the partnership groups. Accordingly, RAID extents in RAID Extent Group 1 212 only indicate drive extents in the Allocated Drive Extents 204, and all drive extents in Allocated Drive Extents 204 are located on and allocated from physical drives contained in Partnership Group A 200. Similarly, RAID extents in RAID Extent Group 2 214 only indicate drive extents in the Allocated Drive Extents 208, and all drive extents in Allocated Drive Extents 208 are located on and allocated from physical drives contained in Partnership Group B 202.

Those drive extents located in physical data storage drives that are contained in Partnership Group A 200 but are not allocated, i.e. that are not contained in Allocated Drive Extents 204, are shown by Spare Drive Extents 206 and are available for future allocation to RAID extents in RAID Extent Group 1 212. Similarly, those drive extents located in physical data storage drives that are contained in Partnership Group B 202 but are not allocated, i.e. that are not contained in Allocated Drive Extents 208, are shown by Spare Drive Extents 210 and are available for future allocation to RAID extents in RAID Extent Group 2 214.

In some embodiments, the unallocated drive extents in Spare Drive Extents 206 are available to be allocated, in response to detecting a failure of a physical data storage drive contained in Partnership Group A 200, to one or more RAID extents in the RAID Extent Group 1 212, to replace drive extents located in the failed physical data storage drive contained in Partnership Group A 200. Similarly, the unallocated drive extents in Spare Drive Extents 210 are available as spare drive extents to be allocated, in response to detecting a failure of a physical data storage drive contained in Partnership Group B 202, to one or more RAID extents in the RAID Extent Group 2 214, to replace drive extents located in the failed physical data storage drive contained in Partnership Group B 202.

In some embodiments, Drive Group Splitting Logic 156 divides the RAID extents in RAID Mapping Table 138 into RAID Extent Group 1 212 and RAID Extent Group 2 214 by first assigning each RAID extent in RAID Mapping Table 138 to one of either RAID Extent Group 1 212 or RAID Extent Group 2 214. For example, Drive Group Splitting Logic 156 may assign a first half of the RAID extents in RAID Mapping Table 138 to RAID Extent Group 1 212. Drive Group Splitting Logic 156 may also assign a second half of the RAID extents in RAID Mapping Table 138 to RAID Extent Group 2 214.

Dividing the RAID extents in RAID Mapping Table 138 by Drive Group Splitting Logic 156 may further include, after each RAID extent in RAID Mapping Table 138 has been assigned to one of either RAID Extent Group 1 212 or RAID Extent Group 2 214, identifying at least one RAID extent that indicates at least one drive extent that is located in a physical data storage drive that is contained in a partnership group other than the partnership group that corresponds to the RAID extent group to which that RAID extent is assigned. For example, Drive Group Splitting Logic 156 may identify a RAID extent in RAID Extent Group 1 212 that indicates a drive extent that is located in a physical data storage drive that is contained in Partnership Group B 202. Similarly, Drive Group Splitting Logic 156 may identify a RAID extent in RAID Extent Group 2 214 that indicates a drive extent that is located in a physical data storage drive that is contained in Partnership Group A 200.

Dividing the RAID extents in RAID Mapping Table 138 by Drive Group Splitting Logic 156 may further include, after at least one RAID extent has been identified that indicates at least one drive extent that is located in a physical data storage drive that is contained in a partnership group other than the partnership group that corresponds to the RAID extent group to which that RAID extent is assigned, modifying each RAID extent that indicates at least one drive extent that is located in a physical data storage drive that is contained in a partnership group other than the partnership group that corresponds to the RAID extent group to which that RAID extent is assigned to indicate only drive extents that are located in physical data storage drives that are contained in the partnership group that corresponds to the RAID extent group to which that RAID extent is assigned.

For example, in the case of a RAID extent in RAID Extent Group 1 212 that indicates a drive extent that is located in a physical data storage drive that is contained in Partnership Group B 202, Drive Group Splitting Logic 156 may allocate a drive extent from Spare Drive Extents 206, and, for that RAID extent, replace the drive extent located in a physical data storage drive contained in Partnership Group B 202 with the drive extent allocated from Spare Drive Extents 206. Replacing the drive extent located in the physical data storage drive contained in Partnership Group B 202 with the drive extent allocated from Spare Drive Extents 206 may include replacing, in the RAID extent, an indication of the drive extent located in the physical data storage drive contained in Partnership Group B 202 with an indication of the drive extent allocated from Spare Drive Extents 206, and copying host data previously stored on the drive extent located in the physical data storage drive contained in Partnership Group B 202 to the drive extent allocated from Spare Drive Extents 206.

In another example, in the case of a RAID extent in RAID Extent Group 2 214 that indicates a drive extent that is located in a physical data storage drive that is contained in Partnership Group A 200, Drive Group Splitting Logic 156 may allocate a drive extent from Spare Drive Extents 210, and, for that RAID extent, replace the drive extent located in the physical data storage drive contained in Partnership Group A 200 with the drive extent allocated from Spare Drive Extents 210. Replacing the drive extent located in the physical data storage drive contained in Partnership Group A 200 with the drive extent allocated from Spare Drive Extents 210 may include replacing, in the RAID extent, an indication of the drive extent located in the physical data storage drive contained in Partnership Group A 200 with an indication of the drive extent allocated from Spare Drive Extents 210, and copying host data previously stored on the drive extent located in the physical data storage drive contained in Partnership Group A 200 to the drive extent allocated from Spare Drive Extents 210.

Each RAID extent in the RAID Mapping Table 138 may indicate the same number of drive extents. For example, in some embodiments configured to provide 4D+1P RAID-5 protection for LUN 144, each RAID extent in the RAID Mapping Table 138 may represent a single data stripe by indicating five drive extents, where each of the five drive extents is located on a different physical data storage drive, and where four of the drive extents are used to store host data written to LUN 144 and one of the drive extents is used to store parity information. In order to provide drive diversity with regard to spare drive extents, the minimum number of physical drives (e.g. in Group of Physical Drives 130, Partnership Group A 200, and/or Partnership Group B 202), that is required to provide 4D+1P RAID-5 protection for LUN 144 must be greater than five, i.e. six or more.

In another example, in some embodiments configured to provide 4D+2P RAID-6 protection for LUN 144, each RAID extent in the RAID Mapping Table 138 may represent a single data stripe by indicating six drive extents, where each of the six drive extents is located on a different physical data storage drive, and where four of the drive extents are used to store host data written to LUN 144 and two of the drive extents are used to store parity information. In order to provide drive diversity with regard to providing spare drive extents, the minimum number of physical data storage drives (e.g. in Group of Physical Drives 130, Partnership Group A 200, and/or Partnership Group B 202), that is required to provide 4D+2P RAID-6 protection for LUN 144 must be greater than six, i.e. seven or more.

In either of the above examples, the minimum number of physical drives required to provide RAID data protection for LUN 144 may be greater than the number of drive extents indicated by each RAID extent in the RAID Mapping Table 138. In some embodiments, the maximum drive group size may be at least twice as large as the minimum number of physical storage drives required to provide RAID data protection for LUN 144.

Figure 3:
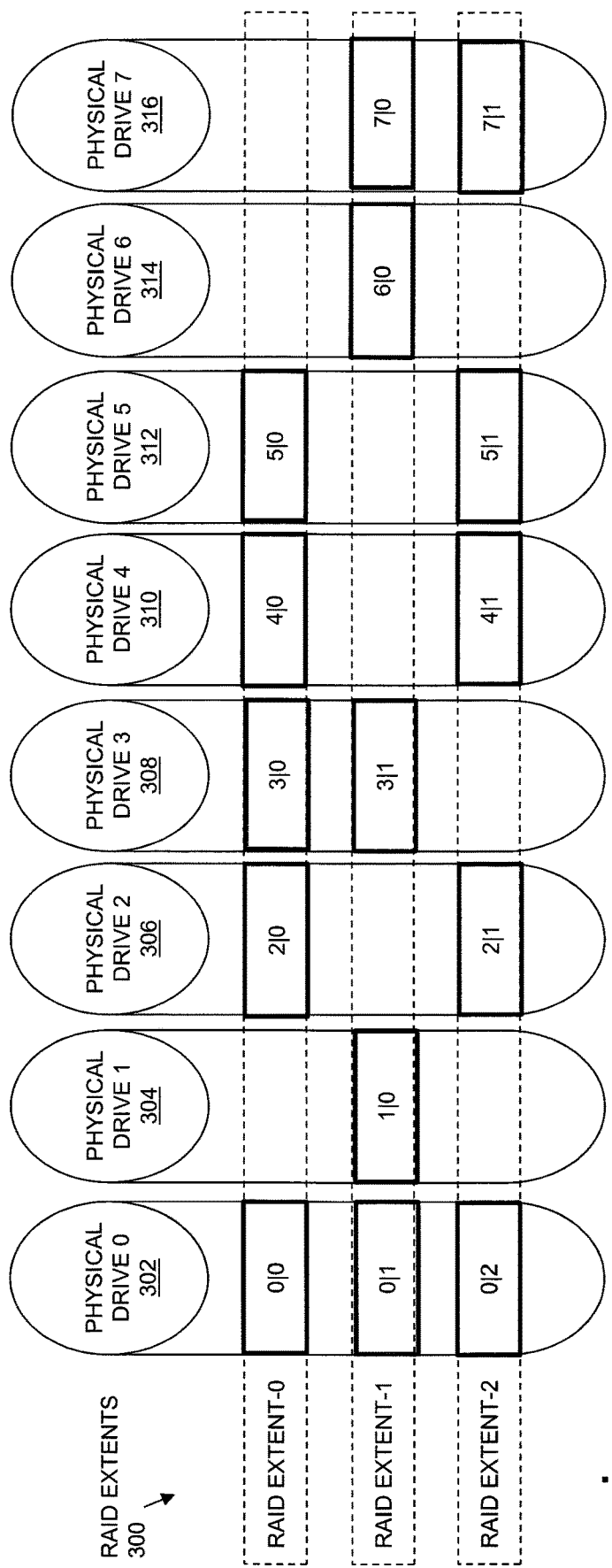
FIG. 3 is a block diagram showing an example of RAID extents.

FIG. 3 is a block diagram showing an illustrative example of RAID Extents 300, as may be contained in the RAID Mapping Table 138 in embodiments that provide 4D+1P RAID-5 striping and data protection. As shown in the example of FIG. 3, RAID Extents 300 include a first RAID Extent-1, a second RAID Extent-2, a third RAID Extent-3, and so on for some total number of RAID extents. In order to provide 4D+1P RAID-5, each RAID extent in RAID Extents 300 indicates five drive extents.

RAID Extent-1 indicates a first drive extent 0|0, which is the first drive extent in Physical Drive 0 302, a second drive extent 2|0, which is the first drive extent in Physical Drive 2 306, a third drive extent 3|0, which is the first drive extent in Physical Drive 3 308, a fourth drive extent 4|0, which is the first drive extent in Physical Drive 4 310, and a fifth drive extent 5|0, which is the first drive extent in Physical Drive 5 312.

RAID Extent-2 indicates a first drive extent 0|1, which is the second drive extent in Physical Drive 0 302, a second drive extent 1|0, which is the first drive extent in Physical Drive 1 304, a third drive extent 3|1, which is the second drive extent in Physical Drive 3 308, a fourth drive extent 6|0, which is the first drive extent in Physical Drive 6 314, and a fifth drive extent 7|0, which is the first drive extent in Physical Drive 7 316.

RAID Extent-3 indicates a first drive extent 0|2, which is the third drive extent in Physical Drive 0 302, a second drive extent 2|1, which is the second drive extent in Physical Drive 2 306, a third drive extent 4|1, which is the second drive extent in Physical Drive 4 310, a fourth drive extent 5|1, which is the second drive extent in Physical Drive 5 312, and a fifth drive extent 7|1, which is the second drive extent in Physical Drive 7 316.

In one example of operation, Physical Drive 0 302 through Physical Drive 7 317 may be part of a larger group of physical data storage drives that is divided into two partnership groups, with a first resulting partnership group made up of a set of at least six physical data storage drives that includes Physical Drive 0 302 through Physical Drive 3 308, and a second resulting partnership group made up of a set of at least six physical data storage drives that includes Physical Drive 4 310 through Physical Drive 7 316. For example, RAID Extent-0 and RAID Extent-1 may be assigned to a first RAID extent group corresponding to the first partnership group, and RAID Extent-2 may be assigned to a second RAID extent group corresponding to the second partnership group.

Since the fourth drive extent and the fifth drive extent indicated by RAID Extent-0 are located in physical data storage drives that are contained in the second partnership group, RAID Extent-0 would be modified so that the fourth drive extent and the fifth drive extent indicated by RAID Extent-0 are instead located in the physical data storage drives contained in the first partnership group.

Since the fourth drive extent and the fifth drive extent indicated by RAID Extent-1 are also located in physical data storage drives that are contained in the second partnership group, RAID Extent-1 would also be modified so that the fourth drive extent and the fifth drive extent indicated by RAID Extent-1 are instead located in the physical data storage drives contained in the first partnership group.

Since the first drive extent and the second drive extent indicated by RAID Extent-2 are located in physical data storage drives that are contained in the first partnership group, RAID Extent-2 would be modified so that the first drive extent and the second drive extent indicated by RAID Extent-2 are instead located in the physical data storage drives contained in the second partnership group.

Figure 4:
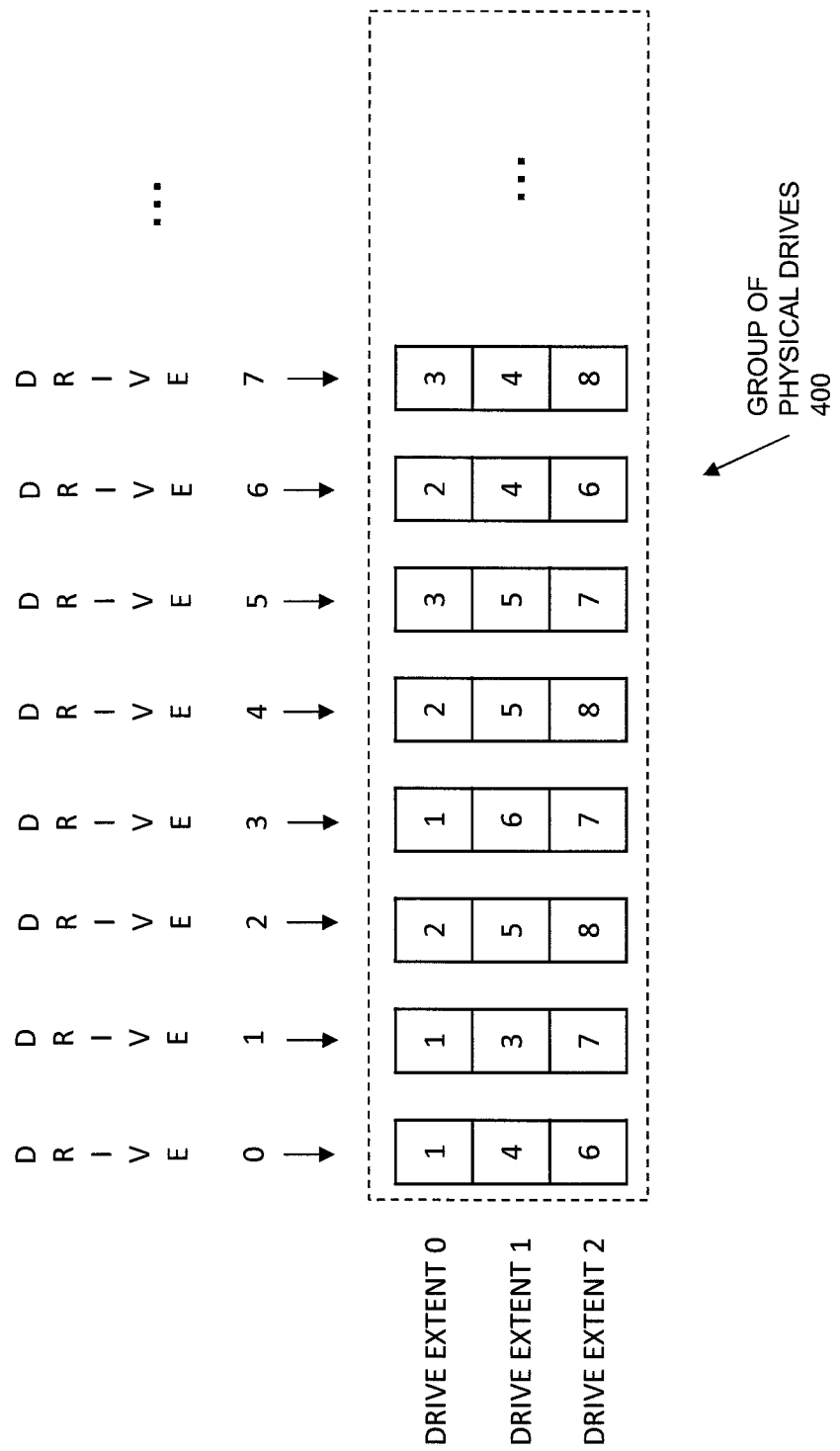
FIG. 4 is a block diagram showing an example of a group of physical data storage drives, and indicates the indices of the RAID extents in the RAID mapping table to which individual drive extents of the physical data storage drives are allocated.

FIG. 4 is a block diagram showing an example of some of the physical data storage drives within a Group of Physical Drives 400, with indications of the indices of the RAID extents in the RAID mapping table to which each individual drive extent is allocated. As shown in the block diagram of FIG. 4, Drive Extent 0 of Physical Data Storage Drive 0 is allocated to RAID extent 1, Drive Extent 1 of Physical Data Storage Drive 0 is allocated to RAID extent 4, Drive Extent 2 of Physical Data Storage Drive 0 is allocated to RAID extent 6, Drive Extent 0 of Physical Data Storage Drive 1 is allocated to RAID extent 1, Drive Extent 1 of Physical Data Storage Drive 1 is allocated to RAID extent 3, Drive Extent 2 of Physical Data Storage Drive 1 is allocated to RAID extent 7, Drive Extent 0 of Physical Data Storage Drive 2 is allocated to RAID extent 2, Drive Extent 1 of Physical Data Storage Drive 2 is allocated to RAID extent 5, Drive Extent 2 of Physical Data Storage Drive 2 is allocated to RAID extent 8, Drive Extent 0 of Physical Data Storage Drive 3 is allocated to RAID extent 1, Drive Extent 1 of Physical Data Storage Drive 3 is allocated to RAID extent 6, Drive Extent 2 of Physical Data Storage Drive 3 is allocated to RAID extent 7, Drive Extent 0 of Physical Data Storage Drive 4 is allocated to RAID extent 2, Drive Extent 1 of Physical Data Storage Drive 4 is allocated to RAID extent 5, Drive Extent 2 of Physical Data Storage Drive 4 is allocated to RAID extent 8, Drive Extent 0 of Physical Data Storage Drive 5 is allocated to RAID extent 3, Drive Extent 1 of Physical Data Storage Drive 5 is allocated to RAID extent 5, Drive Extent 2 of Physical Data Storage Drive 5 is allocated to RAID extent 7, Drive Extent 0 of Physical Data Storage Drive 6 is allocated to RAID extent 2, Drive Extent 1 of Physical Data Storage Drive 6 is allocated to RAID extent 4, Drive Extent 2 of Physical Data Storage Drive 6 is allocated to RAID extent 6, Drive Extent 0 of Physical Data Storage Drive 7 is allocated to RAID extent 3, Drive Extent 1 of Physical Data Storage Drive 7 is allocated to RAID extent 4, and Drive Extent 2 of Physical Data Storage Drive 7 is allocated to RAID extent 8.

Figure 5:
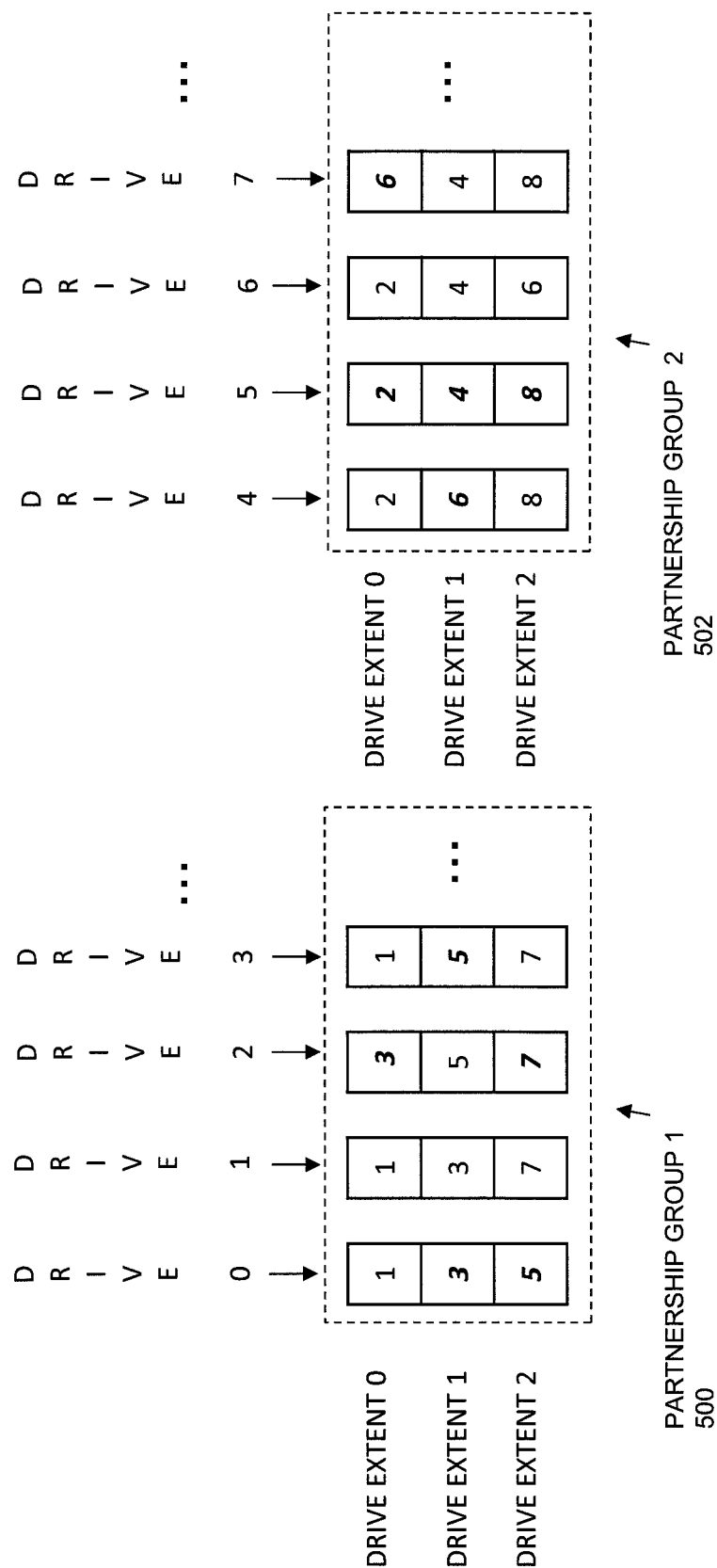
FIG. 5 is a block diagram showing partnership groups generated from the group of physical data storage drives shown in FIG. 4, and indicating changes made in the allocations of specific drive extents made to reflect the generated partnership groups and a set of RAID extent groups.

In an example of operation, Group of Physical Drives 400 is divided into two partnership groups, shown in FIG. 5 by Partnership Group 1 500 and Partnership Group 2 502. Partnership Group 1 500 contains a set of physical data storage drives that includes Physical Data Storage Drive 0, Physical Data Storage Drive 1, Physical Data Storage Drive 2, and Physical Data Storage Drive 3. Partnership Group 2 502 contains a set of physical data storage drives that includes Physical Data Storage Drive 4, Physical Data Storage Drive 5, Physical Data Storage Drive 6, and Physical Data Storage Drive 7. Further in an example of operation, the RAID extents in the RAID mapping table may be divided into two RAID extent groups, i.e. a first RAID extent group to which RAID extents 1, 3, 5, and 7 are assigned, and a second RAID extent group to which RAID extents 2, 4, 6, and 8 were assigned. The first RAID extent group corresponds to Partnership Group 1 500, and the second RAID extent group corresponds to Partnership Group 2 502. The drive extent allocations that are italicized in FIG. 5 indicate allocation modifications that were performed while splitting the Group of Physical Drives 400 into Partnership Group 1 500 and Partnership Group 2 502.

For example, as shown in FIG. 4, Drive Extent 1 of Physical Data Storage Drive 0 was allocated to RAID extent 4 prior to the split. However, as part of the process of splitting the RAID mapping table into RAID extent groups, RAID extent 4 was assigned to the second RAID extent group, which corresponds to Partnership Group 2 502. Accordingly, as shown in FIG. 5, the allocation of Drive Extent 1 of Physical Data Storage Drive 0 is modified during the splitting process such that after the split Drive Extent 1 of Physical Data Storage Drive 0 is allocated to RAID extent 3, which is part of the first RAID extent group.

In another example, as shown in FIG. 4, Drive Extent 2 of Physical Data Storage Drive 0 was allocated to RAID extent 6 prior to the split. However, as part of the process of splitting the RAID mapping table into RAID extent groups, RAID extent 6 was also assigned to the second RAID extent group, which corresponds to Partnership Group 2 502. Accordingly, as shown in FIG. 5, the allocation of Drive Extent 2 of Physical Data Storage Drive 0 is modified during the splitting process such that after the split Drive Extent 2 of Physical Data Storage Drive 0 is allocated to RAID extent 5, which is part of the first RAID extent group.

In another example, as shown in FIG. 4, Drive Extent 0 of Physical Data Storage Drive 2 was allocated to RAID extent 2 prior to the split. However, as part of the process of splitting the RAID mapping table into RAID extent groups, RAID extent 2 was assigned to the second RAID extent group, which corresponds to Partnership Group 2 502. Accordingly, as shown in FIG. 5, the allocation of Drive Extent 0 of Physical Data Storage Drive 2 is modified during the splitting process such that after the split Drive Extent 0 of Physical Data Storage Drive 2 is allocated to RAID extent 3, which is part of the first RAID extent group.

In another example, as shown in FIG. 4, Drive Extent 2 of Physical Data Storage Drive 2 was allocated to RAID extent 8 prior to the split. However, as part of the process of splitting the RAID mapping table into RAID extent groups, RAID extent 8 was assigned to the second RAID extent group, which corresponds to Partnership Group 2 502. Accordingly, as shown in FIG. 5, the allocation of Drive Extent 2 of Physical Data Storage Drive 2 is modified during the splitting process such that after the split Drive Extent 2 of Physical Data Storage Drive 2 is allocated to RAID extent 7, which is part of the first RAID extent group.

In another example, as shown in FIG. 4, Drive Extent 1 of Physical Data Storage Drive 3 was allocated to RAID extent 6 prior to the split. However, as part of the process of splitting the RAID mapping table into RAID extent groups, RAID extent 6 was assigned to the second RAID extent group, which corresponds to Partnership Group 2 502. Accordingly, as shown in FIG. 5, the allocation of Drive Extent 1 of Physical Data Storage Drive 3 is modified during the splitting process such that after the split Drive Extent 1 of Physical Data Storage Drive 3 is allocated to RAID extent 5, which is part of the first RAID extent group.

In another example, as shown in FIG. 4, Drive Extent 1 of Physical Data Storage Drive 4 was allocated to RAID extent 5 prior to the split. However, as part of the process of splitting the RAID mapping table into RAID extent groups, RAID extent 5 was assigned to the first RAID extent group, which corresponds to Partnership Group 1 500. Accordingly, as shown in FIG. 5, the allocation of Drive Extent 1 of Physical Data Storage Drive 4 is modified during the splitting process such that after the split Drive Extent 1 of Physical Data Storage Drive 4 is allocated to RAID extent 6, which is part of the second RAID extent group.

In another example, as shown in FIG. 4, Drive Extent 0 of Physical Data Storage Drive 5 was allocated to RAID extent 3 prior to the split. However, as part of the process of splitting the RAID mapping table into RAID extent groups, RAID extent 3 was assigned to the first RAID extent group, which corresponds to Partnership Group 1 500. Accordingly, as shown in FIG. 5, the allocation of Drive Extent 0 of Physical Data Storage Drive 5 is modified during the splitting process such that after the split Drive Extent 0 of Physical Data Storage Drive 5 is allocated to RAID extent 2, which is part of the second RAID extent group.

In another example, as shown in FIG. 4, Drive Extent 1 of Physical Data Storage Drive 5 was allocated to RAID extent 5 prior to the split. However, as part of the process of splitting the RAID mapping table into RAID extent groups, RAID extent 5 was assigned to the first RAID extent group, which corresponds to Partnership Group 1 500. Accordingly, as shown in FIG. 5, the allocation of Drive Extent 1 of Physical Data Storage Drive 5 is modified during the splitting process such that after the split Drive Extent 1 of Physical Data Storage Drive 5 is allocated to RAID extent 4, which is part of the second RAID extent group.

In another example, as shown in FIG. 4, Drive Extent 2 of Physical Data Storage Drive 5 was allocated to RAID extent 7 prior to the split. However, as part of the process of splitting the RAID mapping table into RAID extent groups, RAID extent 7 was assigned to the first RAID extent group, which corresponds to Partnership Group 1 500. Accordingly, as shown in FIG. 5, the allocation of Drive Extent 2 of Physical Data Storage Drive 5 is modified during the splitting process such that after the split Drive Extent 2 of Physical Data Storage Drive 5 is allocated to RAID extent 8, which is part of the second RAID extent group.

In another example, as shown in FIG. 4, Drive Extent 0 of Physical Data Storage Drive 7 was allocated to RAID extent 3 prior to the split. However, as part of the process of splitting the RAID mapping table into RAID extent groups, RAID extent 3 was assigned to the first RAID extent group, which corresponds to Partnership Group 1 500. Accordingly, as shown in FIG. 5, the allocation of Drive Extent 0 of Physical Data Storage Drive 7 is modified during the splitting process such that after the split Drive Extent 0 of Physical Data Storage Drive 7 is allocated to RAID extent 6, which is part of the second RAID extent group.

FIG. 6 is a flow chart showing an example of steps performed during operation of some embodiments of the disclosed technology. As shown in FIG. 6, at 600 a RAID mapping table is generated containing multiple RAID extents. Each RAID extent contained in the RAID mapping table indicates multiple drive extents that are used to persistently store host data written to a logical storage object, and each drive extent is made up of a contiguous region of non-volatile data storage located in a physical data storage drive in a group of physical data storage drives. At 602 the disclosed technology detects the addition of a new physical data storage drive to the group of physical data storage drives.

At 604 in response to detecting the addition of the new physical data storage drive to the group of physical data storage drives, a total number of physical data storage drives in the group of physical data storage drives is compared to a maximum drive group size.

At 606 in response to detecting that the total number of physical data storage drives in the group of physical data storage drives exceeds the maximum drive group size, the disclosed technology i) divides the group of physical data storage drives into multiple partnership groups of physical data storage drives, such that each physical data storage drive from the group of physical data storage drives is contained in only one of the partnership groups of physical data storage drives, and such that each partnership group of physical data storage drives contains a number of physical data storage drives that is less than the maximum drive group size, and ii) divides the RAID extents in the RAID mapping table into multiple RAID extent groups, such that each one of the RAID extent groups contains multiple RAID extents and corresponds to one of the partnership groups of physical data storage drives, and such that the RAID extents in each RAID extent group only indicate physical data storage drives contained in the corresponding partnership group.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of providing RAID (Redundant Array of Independent Disks) data protection for a storage object in a data storage system, wherein the data storage system includes a storage processor and a group of physical data storage drives communicably coupled to the storage processor, the method comprising:

generating a RAID mapping table, wherein the RAID mapping table contains a plurality of RAID extents, wherein each RAID extent contained in the RAID mapping table represents a single data stripe and contains indications of a plurality of drive extents for persistently storing host data written to the storage object, and wherein each drive extent comprises a contiguous region of non-volatile data storage in one of the physical data storage drives;

detecting the addition of a new physical data storage drive to the group of physical data storage drives;

in response to detecting the addition of the new physical data storage drive to the group of physical data storage drives, comparing a total number of physical data storage drives in the group of physical data storage drives to a predetermined maximum drive group size, wherein the predetermined maximum drive group size is equal to a maximum number of physical data storage drives that may be contained in the group of physical data storage drives before a level of concurrent processing available during a rebuild process becomes limited by performance of at least one resource in the data storage system other than the physical data storage drives; and in response to detecting that the total number of physical data storage drives in the group of physical data storage drives exceeds the maximum drive group size, i) dividing the group of physical data storage drives into a plurality of partnership groups of physical data storage drives, wherein each physical data storage drive from the group of physical data storage drives is contained in only one of the partnership groups of physical data storage drives, and wherein each partnership group of physical data storage drives contains a number of physical data storage drives that is less than the maximum drive group size, and ii) dividing the RAID extents in the RAID mapping table into a plurality of RAID extent groups, wherein each one of the RAID extent groups is stored in the RAID mapping table and contains multiple RAID extents and corresponds to one of the partnership groups of physical data storage drives, and wherein the RAID extents in each RAID extent group contain indications only of drive extents that are located in physical data storage drives contained in the corresponding one of the partnership groups of physical drives.

2. The method of claim 1, wherein dividing the RAID extents in the RAID mapping table into the plurality of RAID extent groups comprises:

assigning each RAID extent in the RAID mapping table to a corresponding one of the RAID extent groups;

identifying at least one RAID extent that contains at least one indication of a drive extent that is located in a physical data storage drive that is contained in a partnership group of physical data storage drives other than the partnership group of physical data storage drives that corresponds to the RAID extent group to which that RAID extent is assigned; and modifying each RAID extent that contains at least one indication of a drive extent that is located in a physical data storage drive that is contained in a partnership group of physical data storage drives other than the partnership group of physical data storage drives that corresponds to the RAID extent group to which that RAID extent is assigned to contain only indications of drive extents that are located in physical data storage drives that are contained in the partnership group of physical data storage drives that corresponds to the RAID extent group to which that RAID extent is assigned.

3. The method of claim 2, wherein each RAID extent in the RAID mapping table contains indications of the same number of drive extents;

wherein a minimum number of physical data storage drives required to provide RAID data protection for the storage object in the data storage system is greater than the number of drive extents indicated by each RAID extent in the RAID mapping table; and wherein the maximum drive group size is at least twice as large as the minimum number of physical data storage drives required to provide RAID data protection for the storage object in a data storage system.

4. The method claim 3, wherein dividing the group of physical data storage drives into a plurality of partnership groups of physical data storage drives comprises dividing the group of physical data storage drives into two partnership groups of physical data storage drives, wherein a first partnership group of physical data storage drives comprises a first half of the physical data storage drives in the group of physical data storage drives and a second partnership group of physical data storage drives comprises a second half of the physical data storage drives in the group of physical data storage drives.

5. The method of claim 4, wherein a plurality of unallocated drive extents located in physical data storage drives contained in the first partnership group of physical data storage drives are available as spare drive extents to be allocated, in response to detecting a failure of a physical data storage drive contained in the first partnership group of physical data storage drives, to one or more RAID extents in the RAID mapping table, to replace drive extents located in the failed physical data storage drive contained in the first partnership group of physical data storage devices; and wherein a plurality of unallocated drive extents located in physical data storage drives contained in the second partnership group of physical storage drives are available as spare drive extents to be allocated, in response to detecting a failure of a physical data storage drive contained in the second partnership group of physical data storage drives, to one or more RAID extents in the RAID mapping table, to replace drive extents located in the failed physical data storage drive contained in the second partnership group of physical data storage drives.

6. The method of claim 5, wherein drive extents are allocated to RAID extents in the RAID mapping table such that no two drive extents indicated by any single RAID extent are located on the same physical data storage drive.

7. A data storage system that provides RAID (Redundant Array of Independent Disks) data protection for a storage object, comprising:

at least one storage processor including processing circuitry and a memory;

a set of physical data storage drives communicably coupled to the storage processor; and wherein the storage processor is configured and arranged to:

generate a RAID mapping table, wherein the RAID mapping table contains a plurality of RAID extents, wherein each RAID extent contained in the RAID mapping table represents a single data stripe and contains indications of a plurality of drive extents for persistently storing host data written to the storage object, and wherein each drive extent comprises a contiguous region of non-volatile data storage in one of the physical data storage drives;

detect the addition of a new physical data storage drive to the group of physical data storage drives;

in response to detecting the addition of the new physical data storage drive to the group of physical data storage drives, compare a total number of physical data storage drives in the group of physical data storage drives to a predetermined maximum drive group size, wherein the predetermined maximum drive group size is equal to a maximum number of physical data storage drives that may be contained in the group of physical data storage drives before a level of concurrent processing available during a rebuild process becomes limited by performance of at least one resource in the data storage system other than the physical data storage drives; and in response to detecting that the total number of physical data storage drives in the group of physical data storage drives exceeds the maximum drive group size, i) divide the group of physical data storage drives into a plurality of partnership groups of physical data storage drives, wherein each physical data storage drive from the group of physical data storage drives is contained in only one of the partnership groups of physical data storage drives, and wherein each partnership group of physical data storage drives contains a number of physical data storage drives that is less than the maximum drive group size, and ii) divide the RAID extents in the RAID mapping table into a plurality of RAID extent groups, wherein each one of the RAID extent groups is stored in the RAID mapping table and contains multiple RAID extents and corresponds to one of the partnership groups of physical data storage drives, and wherein the RAID extents in each RAID extent group contain indications only of drive extents that are located in physical data storage drives contained in the corresponding one of the partnership groups of physical drives.

8. The data storage system of claim 7, wherein to divide the RAID extents in the RAID mapping table into the plurality of RAID extent groups the storage processor is further configured and arranged to:

assign each RAID extent in the RAID mapping table to a corresponding one of the RAID extent groups;

identify at least one RAID extent that contains at least one indication of a drive extent that is located in a physical data storage drive that is contained in a partnership group of physical data storage drives other than the partnership group of physical data storage drives that corresponds to the RAID extent group to which that RAID extent is assigned; and modify each RAID extent that contains at least one indication of a drive extent that is located in a physical data storage drive that is contained in a partnership group of physical data storage drives other than the partnership group of physical data storage drives that corresponds to the RAID extent group to which that RAID extent is assigned to contain only indications of drive extents that are located in physical data storage drives that are contained in the partnership group of physical data storage drives that corresponds to the RAID extent group to which that RAID extent is assigned.

9. The data storage system of claim 8, wherein each RAID extent in the RAID mapping table contains indications of the same number of drive extents;

wherein a minimum number of physical data storage drives required to provide RAID data protection for the storage object in the data storage system is greater than the number of drive extents indicated by each RAID extent in the RAID mapping table; and wherein the maximum drive group size is at least twice as large as the minimum number of physical data storage drives required to provide RAID data protection for the storage object in a data storage system.

10. The data storage system of claim 9, wherein to divide the group of physical data storage drives into a plurality of partnership groups of physical data storage drives, the storage processor is further configured and arranged to divide the group of physical data storage drives into two partnership groups of physical data storage drives, wherein a first partnership group of physical data storage drives comprises a first half of the physical data storage drives in the group of physical data storage drives and a second partnership group of physical data storage drives comprises a second half of the physical data storage drives in the group of physical data storage drives.

11. The data storage system of claim 10, wherein a plurality of unallocated drive extents located in physical data storage drives contained in the first partnership group of physical data storage drives are available as spare drive extents to be allocated, in response to detecting a failure of a physical data storage drive contained in the first partnership group of physical data storage drives, to one or more RAID extents in the RAID mapping table, to replace drive extents located in the failed physical data storage drive contained in the first partnership group of physical data storage devices; and wherein a plurality of unallocated drive extents located in physical data storage drives contained in the second partnership group of physical storage drives are available as spare drive extents to be allocated, in response to detecting a failure of a physical data storage drive contained in the second partnership group of physical data storage drives, to one or more RAID extents in the RAID mapping table, to replace drive extents located in the failed physical data storage drive contained in the second partnership group of physical data storage drives.

12. The data storage system of claim 11, wherein the storage processor is further configured and arranged to allocate drive extents to RAID extents in the RAID mapping table such that no two drive extents indicated by any single RAID extent are located on the same physical data storage drive.

13. A computer program product, comprising:

a non-transitory computer readable medium storing program code for providing RAID (Redundant Array of Independent Disks) data protection for a storage object in a data storage system, wherein the data storage system includes a storage processor and a set of non-volatile data storage devices communicably coupled to the storage processor, the set of instructions, when carried out by at least one processor in the storage processor, causing the storage processor to perform a method of:

generating a RAID mapping table, wherein the RAID mapping table contains a plurality of RAID extents, wherein each RAID extent contained in the RAID mapping table represents a single data stripe and contains indications of a plurality of drive extents for persistently storing host data written to the storage object, and wherein each drive extent comprises a contiguous region of non-volatile data storage in one of the physical data storage drives;

detecting the addition of a new physical data storage drive to the group of physical data storage drives;

in response to detecting the addition of the new physical data storage drive to the group of physical data storage drives, comparing a total number of physical data storage drives in the group of physical data storage drives to a predetermined maximum drive group size, wherein the predetermined maximum drive group size is equal to a maximum number of physical data storage drives that may be contained in the group of physical data storage drives before a level of concurrent processing available during a rebuild process becomes limited by performance of at least one resource in the data storage system other than the physical data storage drives; and in response to detecting that the total number of physical data storage drives in the group of physical data storage drives exceeds the maximum drive group size, i) dividing the group of physical data storage drives into a plurality of partnership groups of physical data storage drives, wherein each physical data storage drive from the group of physical data storage drives is contained in only one of the partnership groups of physical data storage drives, and wherein each partnership group of physical data storage drives contains a number of physical data storage drives that is less than the maximum drive group size, and ii) dividing the RAID extents in the RAID mapping table into a plurality of RAID extent groups, wherein each one of the RAID extent groups is stored in the RAID mapping table and contains multiple RAID extents and corresponds to one of the partnership groups of physical data storage drives, and wherein the RAID extents in each RAID extent group contains indications only of drive extents that are located in physical data storage drives contained in the corresponding one of the partnership groups of physical drives.

14. The computer program product of claim 13, wherein the method performed by the storage processor when the set of instructions is carried out by at least one processor in the storage processor further comprises dividing the RAID extents in the RAID mapping table into the plurality of RAID extent groups at least in part by:

assigning each RAID extent in the RAID mapping table to a corresponding one of the RAID extent groups;

identifying at least one RAID extent that contains at least one indication of a drive extent that is located in a physical data storage drive that is contained in a partnership group of physical data storage drives other than the partnership group of physical data storage drives that corresponds to the RAID extent group to which that RAID extent is assigned; and modifying each RAID extent that contains at least one indication of a drive extent that is located in a physical data storage drive that is contained in a partnership group of physical data storage drives other than the partnership group of physical data storage drives that corresponds to the RAID extent group to which that RAID extent is assigned to contain only indications of drive extents that are located in physical data storage drives that are contained in the partnership group of physical data storage drives that corresponds to the RAID extent group to which that RAID extent is assigned.

15. The computer program product of claim 14, further comprising:

wherein each RAID extent in the RAID mapping table contains indications of the same number of drive extents;

wherein a minimum number of physical data storage drives required to provide RAID data protection for the storage object in the data storage system is greater than the number of drive extents indicated by each RAID extent in the RAID mapping table; and wherein the maximum drive group size is at least twice as large as the minimum number of physical data storage drives required to provide RAID data protection for the storage object in a data storage system.

16. The computer program product of claim 15, wherein dividing the group of physical data storage drives into a plurality of partnership groups of physical data storage drives comprises dividing the group of physical data storage drives into two partnership groups of physical data storage drives, wherein a first partnership group of physical data storage drives comprises a first half of the physical data storage drives in the group of physical data storage drives and a second partnership group of physical data storage drives comprises a second half of the physical data storage drives in the group of physical data storage drives.

17. The computer program product of claim 16, wherein a plurality of unallocated drive extents located in physical data storage drives contained in the first partnership group of physical data storage drives are available as spare drive extents to be allocated, in response to detecting a failure of a physical data storage drive contained in the first partnership group of physical data storage drives, to one or more RAID extents in the RAID mapping table, to replace drive extents located in the failed physical data storage drive contained in the first partnership group of physical data storage devices; and wherein a plurality of unallocated drive extents located in physical data storage drives contained in the second partnership group of physical storage drives are available as spare drive extents to be allocated, in response to detecting a failure of a physical data storage drive contained in the second partnership group of physical data storage drives, to one or more RAID extents in the RAID mapping table, to replace drive extents located in the failed physical data storage drive contained in the second partnership group of physical data storage drives.

18. The computer program product of claim 17, wherein drive extents are allocated to RAID extents in the RAID mapping table such that no two drive extents indicated by any single RAID extent are located on the same physical data storage drive.

19. The method of claim 1, wherein for each one of the RAID extents contained in the RAID mapping table, i) at least one of the plurality of drive extents indicated by the RAID extent is used to store parity information, and ii) the remainder of the plurality of drive extents indicated by the RAID extent are used for persistently storing host data written to the storage object.

20. The method of claim 1, further comprising:

wherein the maximum drive group size is at least twice as large as a minimum number of physical data storage drives that is required to provide RAID data protection for the storage object in a data storage system.

21. The method of claim 1, further comprising:

wherein the predetermined maximum drive group size is equal to a maximum number of physical data storage drives that may be contained in the group of physical data storage drives before a level of concurrent processing available during the rebuild process becomes limited by performance of processing circuitry in the data storage system.

* * * * *